(12) United States Patent
Hockings et al.

(10) Patent No.: US 10,255,430 B2
(45) Date of Patent: *Apr. 9, 2019

(54) SENDING A PASSWORD TO A TERMINAL

(71) Applicant: International Business Machines Corporation, Armonk, NY (US)

(72) Inventors: Christopher J. Hockings, Burleigh Waters (AU); Philip A. J. Nye, Southport (AU); Tadashi Tsumura, Sagamihara (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/677,785

(22) Filed: Aug. 15, 2017

(65) Prior Publication Data

US 2018/0012015 A1 Jan. 11, 2018

Related U.S. Application Data

(63) Continuation of application No. 14/801,895, filed on Jul. 17, 2015, now Pat. No. 9,740,851.

(30) Foreign Application Priority Data

Jul. 30, 2014 (JP) .................................. 2014-154623

(51) Int. Cl.
*G06F 7/04* (2006.01)
*G06F 21/46* (2013.01)
(Continued)

(52) U.S. Cl.
CPC ............ *G06F 21/46* (2013.01); *G06F 21/577* (2013.01); *H04L 63/083* (2013.01);
(Continued)

(58) Field of Classification Search
CPC .................. G06F 21/46; G06F 21/577; G06F 2221/2117; G06F 2221/2131; H04L 63/083; H04L 63/1433
(Continued)

(56) References Cited

U.S. PATENT DOCUMENTS 7,559,084 B2   7/2009 Komai
8,683,052 B1 *  3/2014 Brinskelle ........... H04L 63/0823
                                                    709/228

(Continued)

FOREIGN PATENT DOCUMENTS

CN        101833621 A    9/2010
JP         62198247 A    9/1987
(Continued)

OTHER PUBLICATIONS

Notification of Reasons for Refusal, Japan Application No. 2014-154623, dated Apr. 7, 2016, 6 pgs.
(Continued)

*Primary Examiner* — Samson Lemma
(74) *Attorney, Agent, or Firm* — Jared L. Montanaro

(57) ABSTRACT

A mechanism is provided for sending a password to a terminal. A password send request is received. The status of each of a plurality of terminals coupled to the information processing device via a network is acquired. On the basis of the acquired statuses, at least one item is selected from a group comprising the terminal serving as a destination for the password, the communication method with the terminal, or the method for inputting the password in the terminal. The password is then sent to the selected terminal via a network.

1 Claim, 9 Drawing Sheets

(51) Int. Cl.
*H04L 29/06* (2006.01)
*G06F 21/57* (2013.01)

(52) U.S. Cl.
CPC ....... *H04L 63/1433* (2013.01); *H05K 999/99* (2013.01); *G06F 2221/2117* (2013.01); *G06F 2221/2131* (2013.01)

(58) Field of Classification Search
USPC .......................................................... 726/6
See application file for complete search history.

(56) References Cited

U.S. PATENT DOCUMENTS

| | | | |
|---|---|---|---|
| 9,288,190 B1* | 3/2016 | Brinskelle | H04L 63/0823 |
| 2005/0283619 A1* | 12/2005 | Min | G06F 21/33 |
| | | | 713/182 |
| 2008/0232563 A1* | 9/2008 | Chen | G06F 21/34 |
| | | | 379/93.03 |
| 2009/0300197 A1 | 12/2009 | Tanizawa et al. | |
| 2009/0300738 A1* | 12/2009 | Dewe | G06F 21/33 |
| | | | 726/6 |
| 2010/0251331 A1* | 9/2010 | Li | H04L 69/08 |
| | | | 726/3 |
| 2013/0227683 A1* | 8/2013 | Bettini | G06F 21/57 |
| | | | 726/22 |
| 2014/0359703 A1* | 12/2014 | Nicholson | H04L 63/083 |
| | | | 726/3 |
| 2016/0034685 A1 | 2/2016 | Hockings et al. | |
| 2018/0219851 A1 | 8/2018 | Woo | |

FOREIGN PATENT DOCUMENTS

| | | |
|---|---|---|
| JP | 2001103078 A | 4/2001 |
| JP | 2002352062 A | 12/2002 |
| JP | 2004259020 A | 9/2004 |
| JP | 2005134972 A | 5/2005 |
| JP | 2008078815 A | 4/2008 |
| JP | 2009099095 A | 5/2009 |
| JP | 2009239431 A | 10/2009 |
| JP | 2009540458 A | 11/2009 |
| JP | 2011204050 A | 10/2011 |
| JP | 2014045237 A | 3/2014 |

OTHER PUBLICATIONS

Written Argument, Japan Application No. 2014-154623, translated Nov. 23, 2016, 8 pgs.
Decision to Grant a Patent, Japan Application No. 2014-154623, dated May 16, 2016, 6 pgs.
List of IBM Patents or Patent Applications Treated as Related, Aug. 11, 2017, 2 pgs.

* cited by examiner

Terminal Status Table

| User ID | Terminal ID | OS Version | Rooted | Application | WiFi | Locality | Input Method | Communication Method | User Policy | Risk Determination Result |
|---|---|---|---|---|---|---|---|---|---|---|
| Ua | d1 | A_1.09 | No | App1, App2 | PhoneWiFi | | Key | N/A | Yes | |
| | d2 | A_1.09 | No | App1, App3 | PhoneWiFi | | Voice | N/A | Yes | |
| | d3 | A_1.02 | No | App1, App4 | PhoneWiFi | | N/A | SMS | Yes | |
| | d4 | A_1.09 | Yes | App1, App5 | HomeWiFi | | N/A | OS message | Yes | |
| | | | | | | | N/A | OS message | Yes | |
| Ub | | | | | | | N/A | Voice call | No | |

FIG. 5

Terminal Status Table

| User ID | Terminal ID | OS Version | Rooted | Application | WiFi | Locality | Input Method | Communication Method | User Policy | Risk Determination Result |
|---|---|---|---|---|---|---|---|---|---|---|
| Ua | d1 | A_1.09 | No | App1, App2(F.keylogger) | PhoneWifi | Near | Key | N/A | Yes | High |
| | | | | | | | Voice | SMS | Yes | Low |
| | d2 | A_1.09 | No | App1, App3 (F.SMSRead) | PhoneWifi | Near | N/A | SMS | Yes | High |
| | | | | | | | N/A | OS message | Yes | Low |
| | d3 | A_1.02 | No | App1, App4 | PhoneWifi | Near | N/A | OS message | Yes | High |
| Ub | d4 | A_1.09 | Yes | App1, App5 | HomeWifi | Far | N/A | Voice call | No | High |

| Application ID | Name | Risk Configuration | Malware |
|---|---|---|---|
| App1 | Name A |  | No |
| App2 | Name B | key logger | Yes |
| App3 | Name C | SMS Read | Yes |
| App4 | Name D |  | No |
| App5 | Name E |  | No |

FIG. 8

| User ID | Terminal ID | OS Version | Rooted | Application | WiFi | Position Information GPS | Locality | Input Method |
|---|---|---|---|---|---|---|---|---|
| Ua | d1 | A_1.09 | Yes | App1, App2 | WiFi1 WiFi2 WiFi3 | 3101, 1204 | | Key |
| | | | | | | | | Voice |
| | d2 | A_1.09 | No | App1, App3 | WiFi1 WiFi3 | N/A | | N/A |
| | | | | | | | | N/A |
| | d3 | A_1.02 | No | App1, App4 | WiFi2 | 3104, 1204 | | N/A |
| | d4 | A_1.09 | Yes | App1, App5 | WiFi3 | 3104, 1205 | | N/A |
| Ub | | | | | | | | |

SENDING A PASSWORD TO A TERMINAL

BACKGROUND

The present invention relates to an information processing device, terminal, program, and method for sending a password to a terminal.

Information processing devices are known in which users and terminals are authenticated on the basis of a password inputted using a terminal as disclosed in Patent Publication No. 2004-259020.

SUMMARY

However, because it cannot be determined whether a terminal is authenticated on the basis of a password obtained from a terminal selected by a user in advance, the accuracy with which users and terminals are authenticated is inadequate.

In one illustrative embodiment, a method, in a data processing system, is provided for sending a password to a terminal. The illustrative embodiment receives a password send request. The illustrative embodiment acquires a status of each of a plurality of terminals coupled to the information processing device via a network. The illustrative embodiment selects the terminal from the plurality of terminals based on the acquired statuses using at least one item from a group comprising the terminal serving as a destination for the password, the communication method with the terminal, or the method for inputting the password in the terminal. The illustrative embodiment sends the password to the selected terminal via a network In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus/device is provided. The system/apparatus/device may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

This summary of the present invention is not intended to enumerate all of the required characteristics of the present invention. The present invention may be realized by any combination or sub-combination of these characteristics.

BRIEF DESCRIPTION OF THE DRAWINGS

FIG. 5 is an example of a terminal status table storing the statuses of terminals 14.

FIG. 6 is an example of a terminal status table including risk determination results on the statuses of terminals 14.

FIG. 7 is an example of application information including application risk configurations.

FIG. 8 is another example of statuses of terminals 14.

DETAILED DESCRIPTION

The following is an explanation of the present invention with reference to embodiments of the present invention. However, the present embodiments do not limit the present invention in the scope of the claims. Also, all combinations of characteristics explained in the embodiments are not necessarily required in the technical solution of the present invention.

Figure 1:
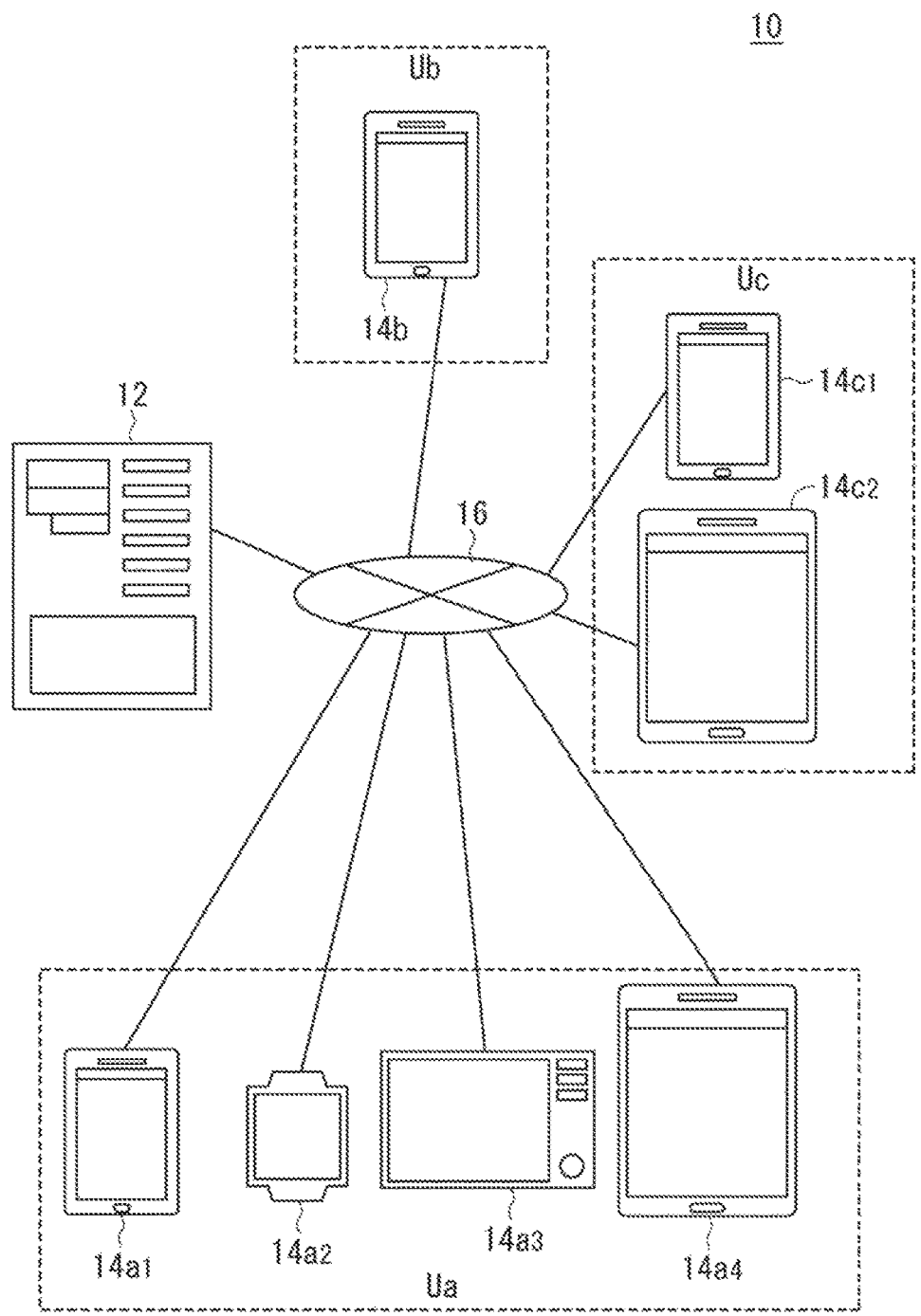
FIG. 1 is a configuration example of an entire information system 10.

FIG. 1 is a configuration example of an entire information system 10. As shown in FIG. 1, the information system 10 includes one or more information processing devices 12 and one or more terminals 14. The information processing devices 12 and the terminals 14 are connected via a network 16 so as to be able to send and receive information such as passwords.

In the information processing system 10, an information processing device 12 authenticates a user U or terminal 14 on the basis of a password PW obtained from the terminal 14 and the status of the terminal 14. For example, when an information processing device 12 obtains a password send request from the user U of each terminal 14 and the status of each terminal 14, a password PW is sent to any one of the terminals 14 of a user U selected on the basis of the status. The information processing device 12 receives a password PW from any one of the terminals 14 of the user U and authenticates the user U, thereby improving authentication accuracy.

An example of an information processing device 12 is one or more computer at a financial institution functioning as a web server for authenticating and providing internet banking services to terminals 14. Another example of an information processing device 12 is one or more computer functioning as a web server providing user authentication services at an IT services company. One of these information processing devices 12 sends a password PW to a terminal 14 in a group of two or more terminals 14, and the password PW is entered using the other terminal 14 in order to provide two-factor authentication or multi-factor authentication for authenticating the user.

The terminal 14 can be a computer such as a smartphone, a watch with communication functions, a car navigation system, or a tablet. Each terminal 14 belongs to either user Ua, Ub or Uc. Here, a single user owns a plurality of terminals 14. When the terminals do not have to be differentiated, the terminals are denoted simply by the reference symbol "14". Terminals denoted by the reference symbols "14a", "14b" and "14c" belong, respectively, to users Ua, Ub and Uc. When differentiating the terminals of each user, for example, the reference symbols for user Ua are "14an" where n=1, 2, etc.

Figure 2:
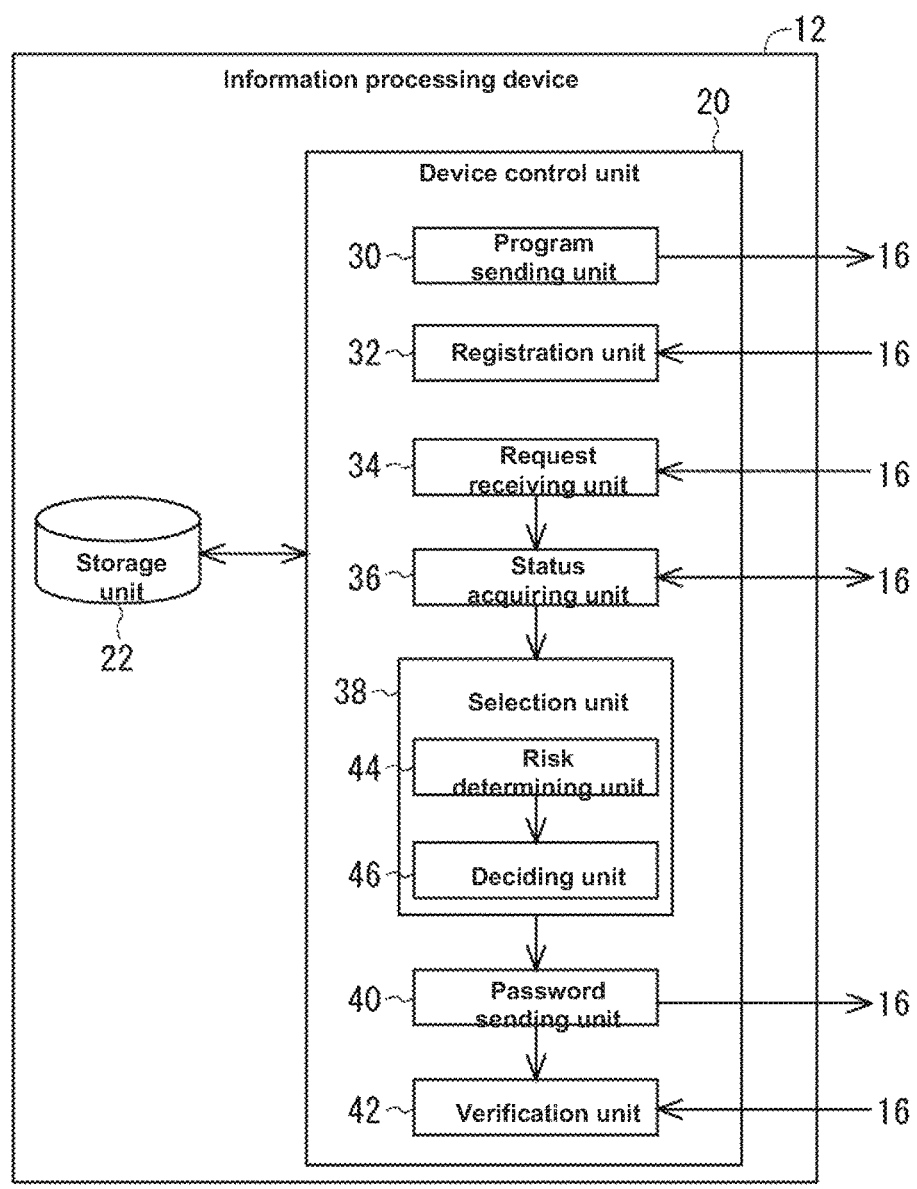
FIG. 2 is a configuration example of an entire information processing device 12.

FIG. 2 is a configuration example of an entire information processing device 12. As shown in FIG. 2, the information processing device 12 has a device control unit 20 and a storage unit 22.

The device control unit 20 includes a processing device such as a central processing unit (CPU). The device control unit 20 includes a program sending unit 30, registration unit 32, request receiving unit 34, status acquiring unit 36, selection unit 38, password sending unit 40, and verification unit 42. The device control unit 20 reads a program stored in the storage unit 22 to function as the program sending unit 30, registration unit 32, request receiving unit 34, status acquiring unit 36, selection unit 38, password sending unit 40, and verification unit 42. The program sending unit 30, registration unit 32, request receiving unit 34, status acquiring unit 36, selection unit 38, password sending unit 40, and verification unit 42 can be configured wholly or in part using hardware such as circuitry.

The program sending unit 30 sends a status acquiring program to a terminal 14 for acquiring the status of the terminal 14. For example, when a send request for a status acquiring program is received, the program sending unit 30 acquires the status acquiring program from the storage unit 22. The program sending unit 30 then sends, via the network 16, the status acquiring program or a terminal application including the status acquiring program to the terminal 14 making the send request.

The registration unit 32 registers terminals 14 on which the status acquiring program has been installed as candidate terminals 14 for receiving a password PW. For example, the registration unit 32 acquires a user ID identifying a user U from a terminal 14 via the network 16, associates the user ID with information on the terminals 14 of the user U, stores the associated information in the storage unit 22, and registers the terminal 14 as a candidate for receiving a password PW.

The request receiving unit 34 receives password send requests. For example, when a user terminal 14 requests authentication by an information processing device 12, the request receiving unit 34 receives a password send request via the network 16 from the terminal 14 which has been registered in the storage unit 22. When the request receiving unit 34 has received a password send request, it notifies the status acquiring unit 36.

The status acquiring unit 36 acquires the status of one or more terminals 14. For example, when the status acquiring unit 36 acquires information from the request receiving unit 34 indicating that a password send request has been received from a terminal 14 registered in the storage unit 22, the status of the terminal 14 is received via the network 16.

The selection unit 38 selects, on the basis of the status acquired from one or more terminals 14, at least one item selected from among the terminal 14 to receive the password PW, the communication method with the terminal 14, and the method used by the terminal 14 to input the password PW. The selection unit 38 has a risk determining unit 44 and a deciding unit 46.

The risk determining unit 44 determines, on the basis of the status of the terminal 14, at least one item selected from among a candidate for the terminal 14 to receive the password PW, a candidate for the communication method with the terminal 14, and a candidate for the method used by the terminal 14 to input the password PW. The risk determining unit 44 outputs the results of this determination to the deciding unit 46.

The deciding unit 46 decides, on the basis of the results determined by the risk determining unit 44, at least one item selected from among the terminal 14 to receive the password PW, the communication method with the terminal 14, and the method used by the terminal 14 to input the password PW. The deciding unit 46 outputs the results of the decision to the password sending unit 40.

The password sending unit 40 sends via the network 16, on the basis of the decision by the deciding unit 46, a password PW to the terminal 14 designated to receive the password PW. An example of a password PW sent by the password sending unit 40 is a one-time password used only for authentication purposes generated by the information processing device 12 in response to an authentication request. The password sending unit 40 outputs the password PW to the verification unit 42.

The verification unit 42 acquires the password PW via the network 16 from the terminal 14 and determines whether or not the password PW matches the one sent by the password sending unit 40. When the passwords PW match, the verification unit 42 authorizes access for the terminal 14.

The storage unit 22 stores programs executed by the information processing device 12, and information and parameters needed to execute the programs.

Figure 3:
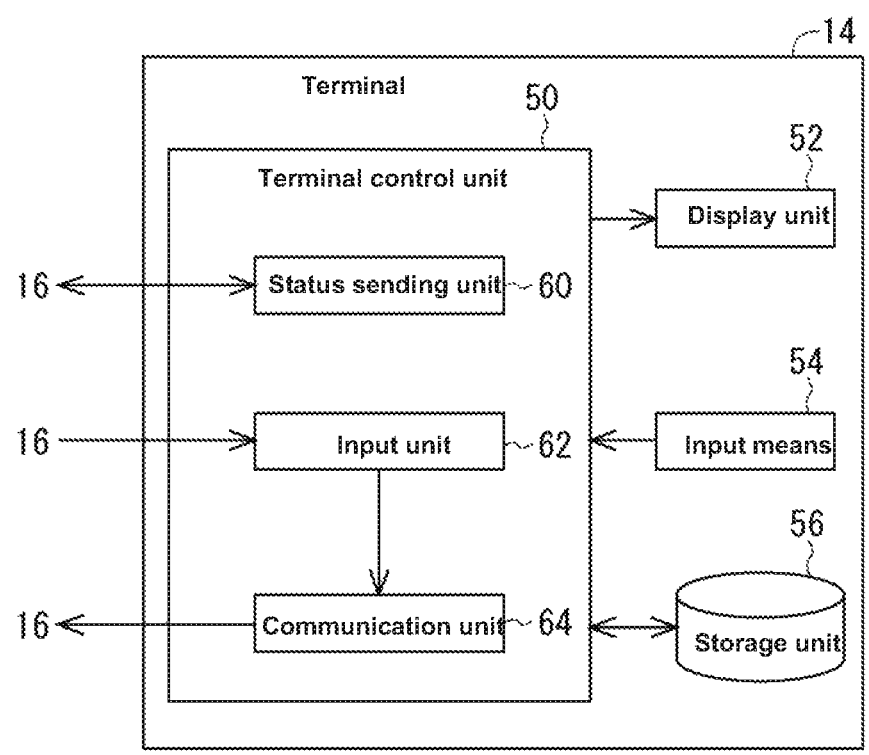
FIG. 3 is a configuration example of a terminal 14.

FIG. 3 is a configuration example of a terminal 14. As shown in FIG. 3, the terminal 14 has a terminal control unit 50, a display unit 52, an input means 54, and a storage unit 56.

The terminal control unit 50 includes a processing device such as a CPU. The terminal control unit 50 includes a status sending unit 60, input unit 62, and communication unit 64. The terminal control unit 50 reads the status acquiring program sent via the network 16 by the program sending unit 30 of the information processing device 12 and stored in the storage unit 56 to function as the status sending unit 60, input unit 62, and communication unit 64. The status sending unit 60, input unit 62, and communication unit 64 can be configured in whole or in part from hardware such as circuitry. Some of the terminals 14 include a status sending unit 60 and a communication unit 64, while others include a status sending unit 60, input unit 62, and communication unit 64.

The status sending unit 60 sends the status of the terminal 14 to the information processing device 12 via the network 16. For example, the status sending unit 60 sends the status of a terminal 14 to the status acquiring unit 36 of the information processing device 12. Examples of the status of a terminal 14 include information related to the WiFi (registered trademark) of the terminal 14 to determine whether there are local risks, information related to applications installed on the terminal 14 to determine the risk from malware and malicious applications that illicitly divulge information, and information related to the version of the operating system (OS) and other applications to determine the risk to the device itself.

The input unit 62 allows a password PW to be inputted by the user U using the input method for the password PW selected by the information processing device 12 on the basis of the status of the terminal 14 which is received via the network 16. For example, the input unit 62 allows the user U to input the password PW by key input via an input means 54 such as a touch panel. The input unit 62 may also allow the user U to input the password PW by voice via an input means 54 such as a microphone. The input unit 62 may display the input method on the display unit 52 to notify the user U, or the input method may be announced over a speaker to notify the user U. The input unit 62 outputs the inputted password PW to the communication unit 64.

The communication unit 64 receives the password PW at the information processing unit 12 using a communication method with the terminal 14 that was selected by the information processing device 12 on the basis of the status of the terminal 14. The communication unit 64 also uses the communication method to send to the information processing device 12 via the network 16 the password PW provided earlier to the user U by the information processing device 12.

The display unit 52 displays a screen based on information inputted from the terminal control unit 50. For example, the display unit 52 displays a screen related to the password PW and the information method acquired from the input unit 62.

The input means 54 receives input from the user U. For example, the input means 54 include a keyboard input device such as a keyboard or touch panel, and a microphone for inputting voice messages. The input means 54 convert input received from the user U into electrical signals, and output these electrical signals to the input unit 62.

The storage unit 56 stores programs executed by the terminal 14, and information and parameters needed to execute the programs.

Figure 4:
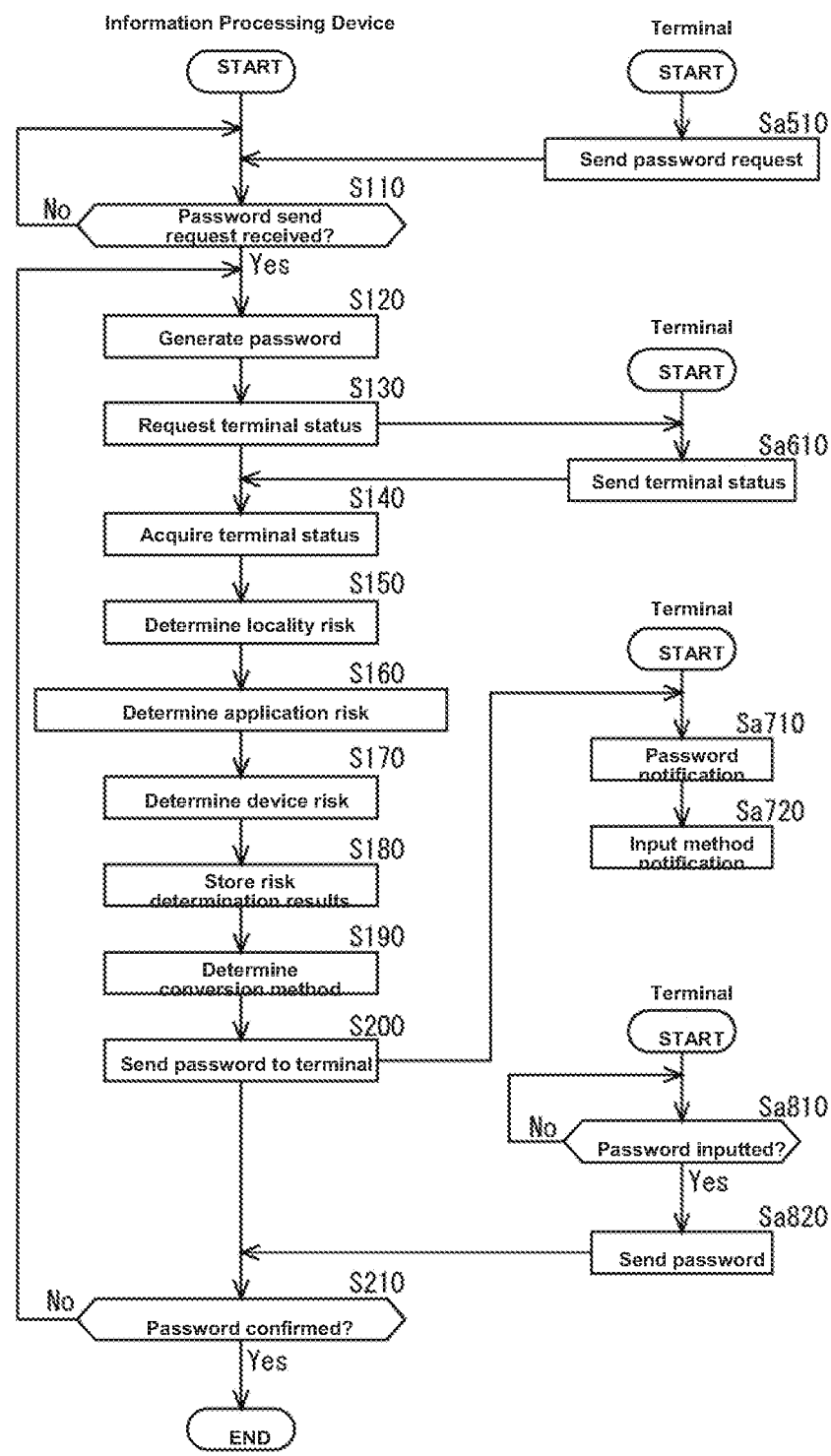
FIG. 4 is a flowchart of the confirmation process performed by the information processing device 12 on the terminal 14.

FIG. 4 is a flowchart of the confirmation process performed by the information processing device 12 on the terminal 14. FIG. 5 is an example of a terminal status table storing the statuses of terminals 14. FIG. 6 is an example of a terminal status table including risk determination results on the statuses of terminals 14. FIG. 7 is an example of application information including application risk configurations.

As shown in FIG. 4, when the confirmation process has started, the request receiving unit 34 in the information processing device 12 determines whether a password send request has been received from a terminal 14 (S110). The request receiving unit 34 goes into standby mode until a password send request is received (S110: No). When a password send request is sent along with a user ID and a terminal ID by the communication unit 64 in a terminal 14 such as terminal 14a1 (Sa510) and the password send request has been received by the request receiving unit 34 (S110: Yes), a password PW is generated and stored in the storage unit 22 (S120). An example of a password PW generated at this time is a one-time password. For example, the request receiving unit 34 generates a four-digit PIN (personal identification number) "2434" as a password PW.

Next, the status acquiring unit 36 receives the status of the terminal 14 (S130). More specifically, the status acquiring unit 36 searches the storage unit 22 for terminal 14 of the user U that is identical to the terminal 14 sending the password send request. The registration unit 32 has stored in the storage unit 22 the information shown in FIG. 5 related to the terminal 14 associates the user ID of the user U with the terminal ID. The status acquiring unit 36 requests the status of the terminal 14 from some or all of the terminals 14 registered by the user U.

In the terminal 14, the status sending unit 60 sends the status of the terminal 14 when a status request is received by the terminal 14 from the information processing device 12 (Sa610).

In the information processing device 12, the status acquiring unit 36 acquires the status of each terminal 14 (S140). For example, the status acquiring unit 36 acquires the status of each terminal 14 as indicated in the terminal status table shown in FIG. 5.

For example, the status acquiring unit 36 acquires the status of a terminal 14 according to the terminal status table shown in FIG. 5. The status of the terminal 14 includes the OS version, rooting indicating whether or not the device can be manipulated using an administrator's account, application identification information Appm (m=1, 2, etc.), WiFi information, input methods, communication methods, and the user policy. The OS version can be the update status of the program installed in the terminal 14. Application identification information Appm can be program identification information identifying the applications installed on the terminal 14.

In the example of a terminal status table shown in FIG. 5, the status acquiring unit 36 acquires information indicating that the OS version of terminals 14a1, 14a2 and 14a4 is A_1.09, which is the latest version, while the OS version of terminal 14a3 is A_1.02, which has not been modified by the latest batch files.

The status acquiring unit 36 also acquires information indicating that terminal 14a4 is rooted, and that the remaining terminals 14a1, 14a2, 14a3 are not rooted.

The status acquiring unit 36 also acquires information indicating that application App1 and application App2 have been installed in terminal 14a1, and that application App1 and application App3 have been installed on terminal 14a2.

The status acquiring unit 36 also acquires information indicating that terminals 14a, 14a2 and 14a3 are connected to the network via phone WiFi, and that terminal 14a4 is connected to the network via home WiFi.

The status acquiring unit 36 also acquires information indicating that terminal 14a1 can receive key input via a keyboard or touch panel and voice input via a microphone. The status acquiring unit 36 also acquires information indicating that terminal 14a2 can communicate via SMS and OS message, terminal 14a3 can communication via OS message, and that terminal 14a4 can communication via voice call.

The status acquiring unit 36 also acquires user policy information indicating that their users have set up terminals 14a1, 14a2, 14a3 for use in the authentication process, but that the user of terminal 14a4 has not set up the device for use in the authentication process.

The status acquiring unit 36 associates the user IDs of each user U (Ua, Ub, etc.) with the terminal IDs of terminals 14 (d1, d2, etc.), stores the status of the terminals 14 in the storage unit 22, and outputs this information to the risk determining unit 44 of the selection unit 38. In the present embodiment, the terminal ID of terminal 14a1 is "d1", the terminal ID of terminal 14a2 is "d2", the terminal ID of terminal 14a3 is "d3", and the terminal ID of terminal 14a4 is "d4".

The risk determining unit 44 determines the risk of each terminal 14 on the basis of the status of the terminal 14 acquired from the status acquiring unit 36.

More specifically, the risk determining unit 44 first determines the local risk of the terminal 14 (S150). The local risk is determined by the risk determining unit 44 based on whether or not the proximity of the terminal 14a1 making the request to other terminals 14a2, 14a3, 14a4 satisfies predetermined criteria using the WiFi status of each terminal 14. In the example of a terminal status table shown in FIG. 6, the WiFi status of the terminal 14a1 making the request and terminals 14a2 and 14a2 is phone WiFi, meaning they are using the same WiFi. In this case, the risk determining unit 44 determines whether or not the terminal 14a1 making the request and terminals 14a2 and 14a2 satisfy predetermined criteria on nearness to each other (=Near), which indicates low risk. On the other hand, the risk determining unit 44 determines that terminal 14a4 using home WiFi, which is different WiFi from the other terminals 14a1, 14a2, 14*a*3 does not satisfy the predetermined criteria. It is far from the other terminals 14*a*1, 14*a*2, 14*a*3 (=Far), which indicates high risk.

The risk determining unit 44 then determines the risk from applications on the terminals 14 (S160). For example, the risk determining unit 44 determines the risk from applications on each terminal 14 on the basis of application information stored in the storage unit 22.

An example of application information, as shown in FIG. 7, associates application IDs with the risk configuration of each application, and the results indicating whether or not malware has been discovered in the application. For example, applications App1, App4 and App5 do not have a risk configuration and no malware is present.

Application App2 includes a key logger for acquiring the internal log of key inputs as a risk configuration, and is registered as malware. The information related to the key logger is an example of permission information indicating whether or not an application installed in the terminal 14 has permission to intercept the input method candidate for the password PW.

Application App3 has read permission enabling short message service (SMS) messages to be read as a risk configuration, and is registered as malware. Information related to read permission is an example of permission information indicating whether or not an application installed in the terminal 14 permits has permission to intercept the communication method candidate for the password PW. Another example of permission information relates to screen captures intercepting the entry of a password PW.

The risk determining unit 44 determines that application App2 in terminal 14*a*1 and application App3 in terminal 14*a*2 are risky. A risk flag is established for applications App2 and App3, and the risk configurations associated with applications App2 and App3 are stored.

The risk determining unit 44 then determines the risk of each terminal 14 as a device (S170). For example, the risk determining unit 44 determines the risk based on whether or not the OS installed in the terminal 14 has been upgraded to a predetermined version. An example of a predetermined version is the latest version. The risk determining unit 44 determines that the risk from terminals 14*a*1, 14*a*2 and 14*a*4, which include A_1.09, or the latest version of the OS, is low, while the risk from terminal 14*a*3, which includes A_1.02, or an old version of the OS, is high. The risk determining unit 44 may determine the risk as a device from the presence or absence of rooting in each terminal 14. The risk determining unit 44 determines that the risk from unrooted terminals 14*a*1, 14*a*2 and 14*a*3 is low, while the risk from rooted terminal 14*a*4 is high.

The risk determining unit 44 stores in the storage unit 22 the comprehensive risk determination results for each terminal 14 based on its status (S180). For example, the risk determining unit 44 determines that the key input risk for terminal 14*a*1 is high (=High) because application App2 has a key logger, but that the voice input risk is low (=Low). Similarly, the risk determining unit 44 determines that the risk from the SMS communication method is high in terminal 14*a*2 because application App3 has SMS read permission, but that the risk from the OS message communication method is low. The risk determining unit 44 determines that the risk from terminal 14*a*3 is high because it has an old version of the OS. The risk determining unit 44 determines that the risk to terminal 14*a*4 is high because terminals 14*a*1, 14*a*2 and 14*a*3 are farther away based on the WiFi.

The risk determining unit 44 may determine only some of the risks to the terminals 14. For example, the risk determining unit 44 may store in advance some or all of the determined risks to each terminal 14 in the storage unit 22, and only results related to recently determined risks.

The deciding unit 46 decides on the password PW exchange systems based on the results determined by the risk determining unit 44 (S190). Here, the term exchange system refers to the terminal 14 used to send a password PW, the terminal 14 used to enter the password PW, the method used to enter the password PW in the terminal 14, the method used by the information processing device 12 to communicate with the terminal 14, and the method used by the terminal 14 to communicate with the information processing device 12.

For example, the deciding unit 46 decides, on condition that the proximity in the risk results meets predetermined criteria and from the OS version, which terminal 14 among a plurality of terminals 14 is to receive the password PW. In the example of the terminal status table shown in FIG. 6, the deciding unit 46 selects terminal 14*a*2 to receive the password PW because the proximity of the terminal meets predetermined criteria.

The deciding unit 46 also selects, based on the permission information acquired from the terminal 14, either a communication method with the terminal 14 or a password PW inputting method for the terminal 14 which cannot be intercepted by an application. In the example of the terminal status table shown in FIG. 6, the deciding unit 46 selects OS message as the communication method used by the information processing device 12 to send the password PW to terminal 14*a*2, and not SMS which can be read and intercepted by application App3 in the terminal 14*a*2 which has read permission. The deciding unit 46 selects terminal 14*a*1 as the terminal 14 used to enter the password PW. The deciding unit 46 selects voice input as the method used to enter the password PW in terminal 14*a*1, and not key input, because application App2, which has a key logger, can record the log and intercept the password. The deciding unit 46 selects SMS as the communication method used by the terminal 14*a*1 to send the password PW to the information processing device 12. Note that the deciding unit 46 can decide, based on the risk determination results related to the OS version, on the communication method with a terminal 14 and the password PW input method used by a terminal 14.

The password sending unit 40 on the sending end sends the exchange system and the password PW to terminal 14*a*2, and outputs the password PW to the verification unit 42 (S200). When the deciding unit 46 has determined that the selection of the candidate for the terminal 14 to receive the password PW, the candidate for the communication method with the terminal 14, and/or the candidate for the method for inputting the password into the terminal 14 exceeds a predetermined criterion, the password sending unit 40 on the sending end may notify the terminal 14 that a password PW cannot be sent.

When the terminal 14*a*2 receives an exchange system and password PW, the input unit 62 notifies the user Ua of the password PW (Sa710). The input unit 62 may, for example, display the exchange system and the password PW on the display unit 52. The input unit 62 may also announce the exchange method and the password PW by voice over the speaker.

Along with the password PW, the input unit 62 notifies the user of the input method in the exchange system (Sa720). Here, the input method includes the terminal 14*a*1 used to enter the password PW, the input means 54 such as keys or a microphone for entering the password PW, and the application used for key input.

The terminal 14*a*1 designated to input the password PW remains in standby mode until the user Ua enters the password PW (Sa810: No). When the user Ua enters the password PW provided in Step Sa710 using the designated input means 54, the input unit 62 acquires the password PW from the input means 54 and outputs it to the communication unit 64 (Sa810: Yes).

The communication unit 64 sends the password PW obtained from the input unit 62 to the information processing device 12 (Sa820).

When the information processing device 12 receives the password PW, the verification unit 42 verifies the password PW to determine whether or not the terminal 14*a*1 sending the password PW has been authenticated (S210). When the password PW matches the password PW sent in Step S200, the verification unit 42 authenticates the terminal 14*a*1 sending the password PW (S210: Yes), and ends the authentication process. Afterwards, the information processing device 12 receives each process performed by the user such as a fund transfer in internet banking. When the password PW does not match the password PW sent in Step S200, the verification unit 42 does not authenticate the terminal 14*a*1 sending the password PW (S210: No), and the process is repeated from Step S120. The authentication process may also be ended when the verification unit 42 has not authenticated the terminal 14*a*1.

As mentioned above, the selection unit 38 in the information processing device 12 selects, on the basis of the status of each terminal 14 acquired by the status acquiring unit 36, the terminal 14 to receive the password PW, the communication method with the terminal 14, and the method used by the terminal 14 to enter the password PW. By having the selection process performed by the information processing device 12, the risk of the password PW being leaked can be reduced compared to a situation in which the user selects the terminal 14 to send the password. As a result, the accuracy of password PW authentication can be improved based on the status of the terminal 14.

More specifically, in the information processing device 12, the risk determining unit 44 determines the risk on the basis of the proximity of terminals 14 to each other, and the deciding unit 46 determines the terminal 14 to receive the password PW based on the results of the risk determination. In this way, the information processing device 12 can send the password PW to a terminal 14 some distance from another terminal 14 that has, for example, been stolen, and the leaking of passwords PW can be further suppressed.

In the information processing device 12, the risk determining unit 44 determines the risk from applications, and the deciding unit 46 decides, based on the results of the risk determination, on the communication method and the input method for the password PW. In this way, the information processing device 12 can reduce the instances of passwords PW being intercepted during communication and passwords PW being intercepted during input by malicious applications, and the leaking of passwords PW can be further suppressed.

In the information processing device 12, the risk determining unit 44 determines the risk from the OS version and rooting, and the deciding unit 46 decides, based on the results of the risk determination, the terminal 14 to receive the password PW. In this way, the leaking of passwords PW caused by sending passwords PW to vulnerable terminals 14 can be suppressed by the information processing device 12.

The following is an explanation of partially modified embodiments. Here, the relationship between components and the devices exchanging information in the embodiment described above may be changed as needed.

Here, the status acquiring unit 36 may acquire the status of a terminal 14 at different times. This can reduce the amount of communication and communication times compared to situations in which the status acquiring unit 36 acquires the status of a terminal 14 each time authentication is performed using a password PW. Here, the selection unit 38 may select, based on an acquired status history, at least one item from a group including the terminal 14 to receive the password, the communication method with the terminal 14, and the method used by the terminal 14 to enter the password.

In addition to those mentioned above, applicable communication methods also include a mobile phone network, wireless LAN such as WiMAX (registered trademark), mobile voice, email, and the web.

FIG. 8 is another example of statuses of terminals 14. As shown in FIG. 8, the status of each terminal 14 includes location information detected by GPS. Here, the risk determining unit 44 calculates the distances between each terminal 14 based on location information or a location information history, and determines whether or not the proximity exceeds a predetermined criterion. More specifically, when the distance does not exceed a predetermined criterion, the risk determining unit 44 determines that the proximity between terminals 14 is high. The risk determining unit 44 may also determine proximity based on whether each terminal 14 is connected to the same base station or communication station. More specifically, when each terminal 14 is using the same base station, the risk determining unit 44 determines that the proximity between the terminals 14 is high.

The risk determining unit 44 may determine the proximity between terminals 14 based on the vibration history of each terminal 14. Here, a vibration sensor is installed in each terminal 14, and the history of vibration information detected by the vibration sensors is acquired by the status acquiring unit 36 as the status of the terminal 14, and outputted to the risk determining unit 44. When terminals 14 have a similar history of vibration information, the risk determining unit 44 determines that they are close to each other and have a high proximity to each other. In this way, the risk determining unit 44 can determine that the terminals 14 are owned by one person, are close to each other, and have a high proximity to each other. The risk determining unit 44 may determine the proximity between terminals 14 based on the temperature history of each terminal 14. For example, the risk determining unit 44 may determine that the proximity between terminals 14 with a similar temperature history is high. The risk determining unit 44 may also determine the proximity between terminals 14 based on the history of near field communication (NFC) between the terminals 14.

In the embodiment described above, the selection unit 38 selected all of the items in a group including the terminal 14 to receive the password PW, the communication method with the terminal 14, and the method used by the terminal 14 to enter the password PW. However, selection unit 38 may select at least one of these items.

In the embodiment described above, the status acquiring unit 36 acquired the status of terminals 14, and the risk determining unit 44 used the agent system to determine the risk of each terminal 14 on the basis of the status of the terminal 14. However, the risk to a terminal 14 may also be diagnosed using a remote scanner, or a diagnostic program such as a program written in JavaScript (registered trademark).

Figure 9:
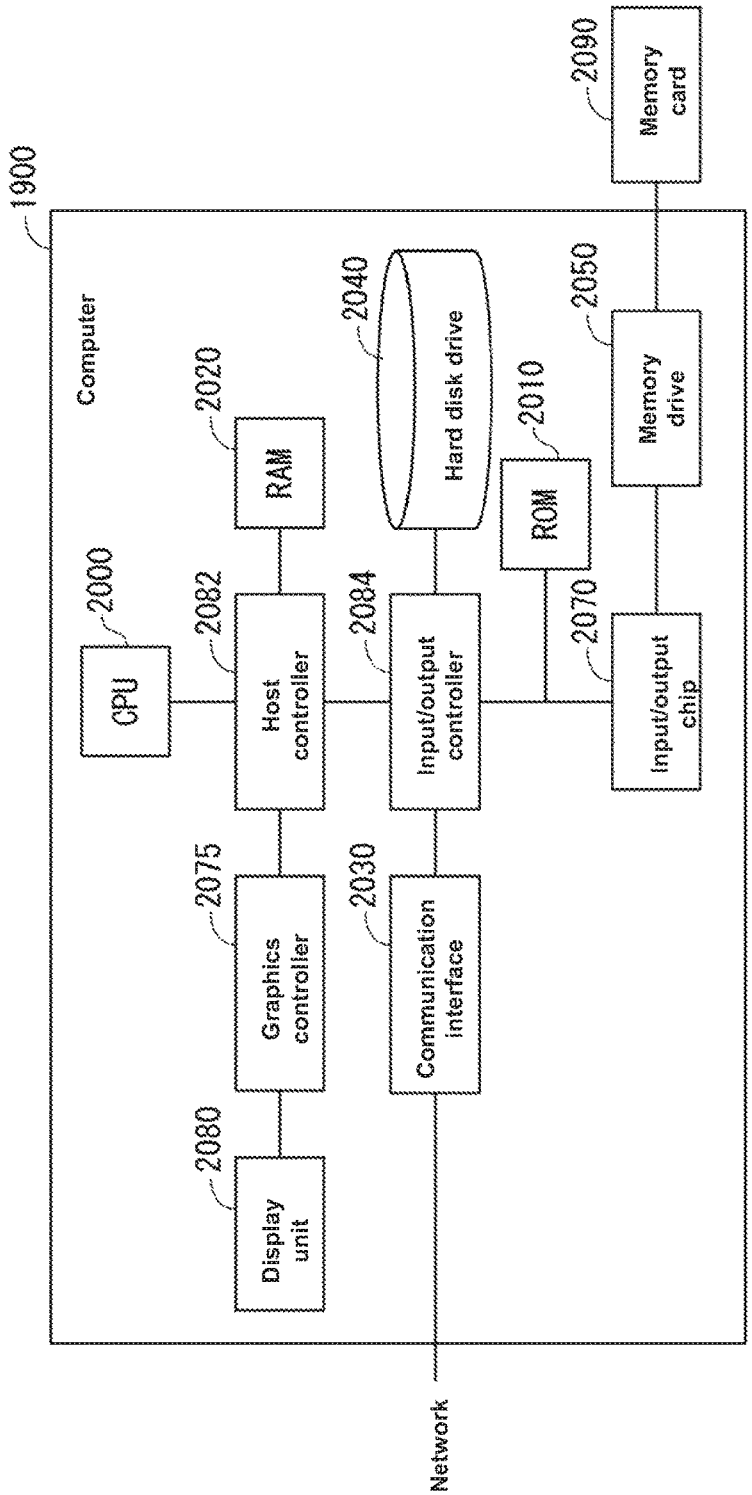
FIG. 9 shows an example of a hardware configuration for a computer 1900 related to the embodiment.

FIG. 9 shows an example of a hardware configuration for a computer 1900 related to the present embodiment. The computer 1900 related to the present embodiment is an example of an information processing device 12 and terminal 14. The computer 1900 in the present embodiment is equipped with a CPU peripheral portion having a CPU 2000, RAM 2020, graphics controller 2075 and display unit 2080 connected to each other by a host controller 2082, an input/output portion having a communication interface 2030, and a hard disk drive 2040 connected to the host controller 2082 by an input/output controller 2084, and a legacy input/output portion having a ROM 2010, memory drive 2050, and input/output chip 2070 connected to the input/output controller 2084.

The host controller 2082 is connected to RAM 2020, a CPU 2000 accessing the RAM 2020 at a high transfer rate, and a graphics controller 2075. The CPU 2000 is operated on the basis of a program stored in the ROM 2010 and the RAM 2020, and controls the various units. The graphics controller 2075 acquires the image data generated in the frame buffer of the RAM 2020 by the CPU 2000 and other units, and displays this image data on the display unit 2080. Alternatively, the graphics controller 2075 can include a frame buffer for storing image data generated by the CPU 2000 and other units.

The input/output controller 2084 is connected to a host controller 2082, a communication interface 2030 serving as a relatively high-speed input/output device, and a hard disk drive 2040. The communication interface 2030 communicates with the other devices via a network. The hard disk drive 2040 stores the programs and data used by the CPU 2000 in the computer 1900.

The input/output controller 2084 is connected to the ROM 2010, the memory drive 2050, and the relatively low-speed input/output device of the input/output chip 2070. The ROM 2010 stores the boot program executed by the computer 1900 at startup and/or programs relying on hardware in the computer 1900. The memory drive 2050 reads programs or data from a memory card 2090, and provides the programs and data to the hard disk drive 2040 via the RAM 2020. The input/output chip 2070 connects the memory drive 2050 to the input/output controller 2084, and various types of input/output device are connected to the input/output controller 2084 via a parallel port, serial port, keyboard port, or mouse port, etc.

A program provided to the hard disk drive 2040 via the RAM 2020 is stored on a recording medium such as a memory card 2090 or an IC card provided by the user. A program is read from the recording medium, installed in the hard disk drive 2040 inside the computer 1900 via the RAM 2020, and executed by the CPU 2000.

Programs installed in the computer 1900 to enable the computer 1900 to function as an information processing device 12 include a program sending module, registration module, request receiving module, status acquiring module, selection module, password sending module, and verification module. Those programs or modules work with the CPU 2000 and other components to cause the computer 1900 to function as the program sending unit 30, registration unit 32, request receiving unit 34, status acquiring unit 36, selection unit 38, password sending unit 40, and verification unit 42.

The information processing steps written in these programs are specific means activated by reading the programs to the computer 1900 so that the software cooperates with the various types of hardware resources described above. These specific means function as a program sending unit 30, registration unit 32, request receiving unit 34, status acquiring unit 36, selection unit 38, password sending unit 40, and verification unit 42. These specific means realize operations and the processing of information in the computer 1900 of the present embodiment to construct a dedicated information processing device 12 for the intended purpose.

Programs installed in the computer 1900 to enable the computer 1900 to function as a terminal 14 include a status sending module, an input module, and a communication module. Those programs or modules work with the CPU 2000 and other components to cause the computer 1900 to function as a status sending unit 60, an input unit 62, and a communication unit 64.

The information processing steps written in these programs are specific means activated by reading the programs to the computer 1900 so that the software cooperates with the various types of hardware resources described above. These specific means function as the status sending unit 60, input unit 62, and communication unit 64. These specific means realize operations and the processing of information in the computer 1900 of the present embodiment to construct a dedicated terminal 14 for the intended purpose.

For example, when the computer 1900 communicates with an external device, the CPU 2000 executes the communication program loaded in the RAM 2020, and instructs the communication interface 2030 in the communication processing on the basis of the processing content described in the communication program. The communication interface 2030 is controlled by the CPU 2000, and reads the transmitted data stored in the transmission buffer region of a memory device such as the RAM 2020, hard disk drive 2040, or memory card 2090, or writes reception data received from the network to a reception buffer region of the storage device. In this way, the communication interface 2030 exchanges data with a storage device using the direct memory access (DMA) method. Alternatively, the CPU 2000 may exchange data by retrieving data from the source storage device or communication interface 2030, and writing the data to the destination communication interface 2030 or storage device.

Also, the CPU 2000 writes all of the data or the necessary data to the RAM 2020 via, for example, a DMA transfer, from files or databases stored in an external storage device such as a hard disk drive 2040 or a memory drive 2050 (memory card 2090), and performs various types of processing on the data in the RAM 2020. The CPU 2000 then writes the processed data to an external storage device via, for example, a DMA transfer. Because the RAM 2020 temporarily stores the contents of the external storage device during this process, the RAM 2020 and the external storage device are generally referred to in the present embodiment as memory, a storage unit, or a storage device. The various types of information in the programs, data, tables and databases of the present embodiment are stored in these memory devices, and are the targets of information processing. The CPU 2000 can hold some of the RAM 2020 in cache memory, and read and write data to the cache memory. Here, the cache memory performs some of the functions of the RAM 2020. Therefore, this division is excluded in the present embodiment. Cache memory is included in the RAM 2020, the memory, and/or the storage device.

The CPU 2000 also performs various types of processing on data read from the RAM 2020 including the operations, processing, condition determination, and information retrieval and substitution described in the present embodiment and indicated by a sequence of instructions in the program, and writes the results to the RAM 2020. For example, when performing a condition determination, the CPU 2000 compares various types of variables described in the present embodiment to other variables or constants to determine whether or not conditions such as greater than, less than, equal to or greater than, equal to or less than or equal to have been satisfied. When a condition has been satisfied (or not satisfied), the process branches to a different sequence of instructions or calls up a subroutine. The CPU 2000 can also search files in a storage device or information stored in a database.

A program or module described above can be stored in a recording medium of an external unit. Instead of a memory card 2090, the recording medium can be an optical recording medium such as a DVD or CD, a magneto-optical recording medium such as MO, a tape medium, or a semiconductor memory such as an IC card. The recording medium can also be a storage device such as a hard disk or RAM provided in a server system connected to a dedicated communication network or the internet, and the program can be provided to the computer 1900 via the network.

The present invention was explained using an embodiment, but the technical scope of the present invention is not limited to the embodiment described above. The possibility of many changes and improvements to this embodiment should be apparent to those skilled in the art. Embodiments including these changes and improvements are within the technical scope of the present invention, as should be clear from the description of the claims.

The order of execution for operations, steps and processes in the devices, systems, programs and methods described in the claims, description and drawings was described using terms such as "previous" and "prior". However, these operations, steps and processes can be realized in any order as long as the output of the previous process is used by the subsequent process. The operational flow in the claims, description and drawing were explained using terms such as "first" and "next" for the sake of convenience. However, the operational flow does not necessarily have to be executed in this order.

The invention claimed is:

1. An information processing device for sending a password to a terminal, the information processing device comprising:
 a memory; and
 a computer processor, wherein the processor is configured to:
 receive a password send request;
 acquire the status of a terminal, wherein the status of the terminal includes information that determines the proximity of the terminal sending the password send request and another terminal; and
 determine whether the other terminal is to serve as the destination of the password on a condition that the proximity of the terminal to the other terminal meets a predetermined criterion, wherein the predetermined criterion is that the terminal and the other terminal are in the same geographical proximity and are at the same temperature;
 select, on the basis of the acquired status, at least one item from a group including the terminal serving as the destination of the password, the communication method with the terminal, and the method for inputting the password in the terminal; and
 select either a communication method or an input method unable to be intercepted by a program identified by program identification information acquired from the terminal, wherein the communication method or the input method unable to be intercepted by the identified program include changing the input of the password from short message service (SMS) to OS messaging.

* * * * *